United States Patent
Kline et al.

(10) Patent No.: US 10,375,364 B2
(45) Date of Patent: Aug. 6, 2019

(54) DEVICE FOR AMBIENCE OBSTRUCTION BY AN OBJECT

(71) Applicant: International Business Machines Corporation, Armonk, NY (US)

(72) Inventors: Eric V. Kline, Rochester, MN (US); Frank R. Libsch, White Plains, NY (US); Thomas S. Mazzeo, Durham, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/837,307

(22) Filed: Aug. 27, 2015

(65) Prior Publication Data

US 2015/0365642 A1 Dec. 17, 2015

Related U.S. Application Data

(63) Continuation of application No. 14/248,458, filed on Apr. 9, 2014.

(51) Int. Cl.
*G06F 3/01* (2006.01)
*G06T 7/00* (2017.01)
(Continued)

(52) U.S. Cl.
CPC ........... *H04N 9/3185* (2013.01); *G06F 3/013* (2013.01); *G06T 7/20* (2013.01); *G06T 7/70* (2017.01);
(Continued)

(58) Field of Classification Search
CPC ........... G06F 3/013; G06T 7/004; G06T 7/20; H04N 5/23293; H04N 5/335; H04N 7/18; H04N 9/3185
(Continued)

(56) References Cited

U.S. PATENT DOCUMENTS 5,307,162 A * 4/1994 Schowengerdt ......... H04N 7/18
348/122
6,459,076 B1 * 10/2002 Schlenker ................. F41H 3/00
250/205

(Continued)

OTHER PUBLICATIONS

IBM; "Domain Based Cloaking"; An IP.com Prior Art Database Technical Disclosure; http://ip.com/IPCOM/000011585D; Mar. 6, 2003.

(Continued)

*Primary Examiner* — Deirdre L Beasley
(74) *Attorney, Agent, or Firm* — Garg Law Firm, PLLC; Rakesh Garg; Tihon Poltavets

(57) ABSTRACT

A method, system, and apparatus for alleviating an obstruction caused by an object from a view of an observer includes a hardware device affixed to the object such that the observer observes a presentation on the device when observing the object. The device is enabled to receive a signal, wherein the signal corresponds to a portion of an ambience obscured by the object from a view of the observer. The signal is processed at the device and without using a data processing system, to generate a version of the signal. Using the device, the version of the signal is presented to the observer as the presentation, wherein the version of the signal alleviates the portion of the ambience obstructed by the object in the view of the observer.

8 Claims, 9 Drawing Sheets

(51) Int. Cl.
*G06T 7/20* (2017.01)
*H04N 5/232* (2006.01)
*H04N 7/18* (2006.01)
*H04N 9/31* (2006.01)
*G06T 7/70* (2017.01)
*H04N 5/335* (2011.01)

(52) U.S. Cl.
CPC ......... *H04N 5/23293* (2013.01); *H04N 5/335* (2013.01); *H04N 7/18* (2013.01)

(58) Field of Classification Search
USPC ........................................................ 348/143
See application file for complete search history.

(56) References Cited

U.S. PATENT DOCUMENTS

| | | | |
|---|---|---|---|
| 7,199,344 B2 | 4/2007 | Blake | |
| 8,836,792 B1* | 9/2014 | Butler | H04R 1/40 |
| | | | 348/163 |
| 2002/0117605 A1 | 8/2002 | Alden | |
| 2002/0162942 A1* | 11/2002 | Alden | G02B 26/06 |
| | | | 250/208.1 |
| 2004/0213982 A1 | 10/2004 | Touzov | |
| 2006/0131478 A1 | 6/2006 | Alden | |
| 2007/0190368 A1* | 8/2007 | Jung | F41H 3/00 |
| 2013/0088516 A1* | 4/2013 | Ota | G06T 11/00 |
| | | | 345/633 |
| 2013/0169681 A1* | 7/2013 | Rasane | G06T 19/006 |
| | | | 345/633 |
| 2014/0078175 A1* | 3/2014 | Forutanpour | G02B 27/017 |
| | | | 345/633 |
| 2014/0178003 A1* | 6/2014 | Young | F41H 3/02 |
| | | | 385/37 |
| 2015/0195042 A1* | 7/2015 | Raskar | H04B 10/502 |
| | | | 398/118 |

OTHER PUBLICATIONS

IBM; "State Based Cloaking"; An IP.com Prior Art Database Technical Disclosure; http://ip.com/IPCOM/000015378D; Jun. 20, 2003.
New Scientist, Video: Revealing the technology of invisibility—tech—Feb. 4, 2009, http://www.newscientist.com/article/dn16527-video-revealing-the-technology-of-invisibility.html.
Washington Times, Invisibility feasible with 'flex' material, Nov. 4, 2010, http://www.washingtontimes.com/news/2010/nov/4/scottish-physicists-claim-develop-invisibility.
NY Daily News, Scientists in Germany invent invisibility cloak, Mar. 20, 2010, 1:29 PM, http://articles.nydailynews.com/2010-03-20/news/27059544_1_invisibility-cloak-dimensions.
Today, Invisibility cloak made of silk created—today, 2012 Discovery Channel, http://today.msnbc.msn.com/id/38657474/ns/today-today_tech/.
How Stuff Works, HowStuffWorks "Is the Army testing an invisible tank?", http://science.howstuffworks.com/invisible-tank.htm, 2012.

* cited by examiner

DEVICE FOR AMBIENCE OBSTRUCTION BY AN OBJECT

TECHNICAL FIELD

The present invention relates generally to obfuscating physical objects. More particularly, the present invention relates to a method for cloaking an object from an observer using a cloaking device.

BACKGROUND

Cloaking is the capability of hiding physical objects in plain sight. Camouflaging objects with print designs that blend into the background, or covering objects with background-matching covers, shapes, foliage, and other materials are some commonly known methods of cloaking or obfuscating physical objects in plain sight.

SUMMARY

The illustrative embodiments provide a method for cloaking using a cloaking device. An embodiment includes a method for cloaking an object from an observer. The embodiment affixes a hardware device to the object such that the observer observes a presentation on the device when observing the object. The embodiment enables the device to receive a signal, wherein the signal corresponds to a portion of an ambience obscured by the object from a view of the observer. The embodiment processes, at the device and without using a data processing system, the signal to generate a version of the signal. The embodiment presents, using the device, the version of the signal to the observer as the presentation, wherein the version of the signal cloaks the object from the ambience in the view of the observer.

Another embodiment includes an apparatus for cloaking an object from an observer. The embodiment further includes a hardware device affixed to the object such that the observer observes a presentation on the device when observing the object. The embodiment further includes a set of detecting components of the device, wherein the set of detecting components receives a signal, wherein the signal corresponds to a portion of an ambience obscured by the object from a view of the observer. The embodiment further includes processing hardware at the device, to process without using a data processing system, the signal to generate a version of the signal. The embodiment further includes a set of emitting components, to present the version of the signal to the observer as the presentation, wherein the version of the signal cloaks the object from the ambience in the view of the observer.

Another embodiment includes a cloaking device to cloak an object from an observer. The embodiment further includes a hardware matrix device, wherein the hardware matrix device is affixed to the object such that the observer observes a presentation on the device when observing the object. The embodiment further includes a set of detecting components in the hardware matrix device, wherein the set of detecting components receives a signal, wherein the signal corresponds to a portion of an ambience obscured by the object from a view of the observer. The embodiment further includes processing hardware at the hardware matrix device, to process without using a data processing system, the signal to generate a version of the signal. The embodiment further includes a set of emitting components in the hardware matrix device, to present the version of the signal to the observer as the presentation, wherein the version of the signal cloaks the object from the ambience in the view of the observer.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
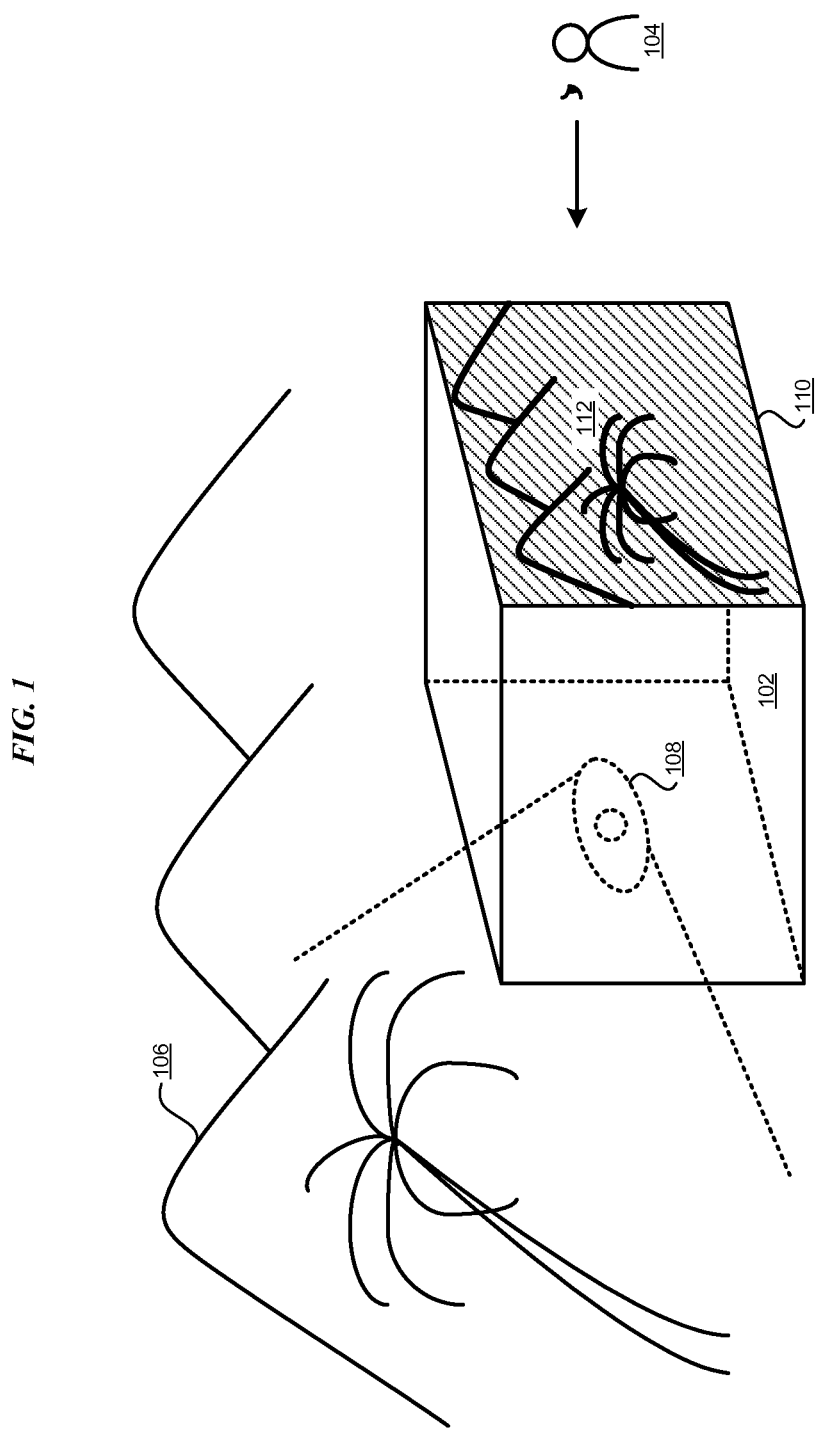
FIG. 1 depicts a block diagram of an example environment for deploying a cloaking device in accordance with an illustrative embodiment.

Within the scope of the disclosure, ambience comprises features present in the background, foreground, or surrounding of an object that is to be cloaked. An ambient signal comprises a signal present in the ambience of the object, where the ambient signal is usable by the observer to detect a presence of the object in the ambience.

The illustrative embodiments recognize that the presently available methods for cloaking, such as camouflaging prints and shapes are largely unchanging in a dynamic environment. Some presently available cloaking technology uses sophisticated computers to capture and project the dynamic background image onto an object's surface to give the object an appearance of blending into the background.

The illustrative embodiments recognize that the necessary use of computers in the presently available cloaking technology is undesirable for several reasons. For example, the computers take up space in or around the cloaked objects when such space is at a premium in such circumstances. As another example, computers consume considerable amounts of electrical power where the availability of such power is also at a premium. Furthermore, the computer-based cloaking technologies add additional components, e.g., the computer, which increase the complexity of the cloaking setup.

The illustrative embodiments used to describe the invention generally address and solve the above-described problems and other problems related to obfuscating physical objects. The illustrative embodiments provide a method for cloaking using a cloaking device.

For example, the illustrative embodiments describe an active presentation matrix (matrix). The matrix is affixed to an object that is to be cloaked. The matrix does not require a computer to capture and present the background or ambient signals from around the object to an observer of the object.

In one embodiment, the matrix is configured with components that capture and project ambient signals in the visible frequency spectrum. For example, when a vehicle is stationarily positioned (static) between a landscape and an observer, the observer visually perceives the vehicle because of the obstructed view of the landscape and the presence of the vehicle's visual characteristics in the obstructed portion of the view of the landscape. As another example, when a vehicle is moving between a landscape and an observer (dynamic), the observer visually perceives the vehicle because different portions of the view of the landscape are obscured by the presence of the vehicle's visual characteristics in different portions of the view of the landscape at different times during the vehicle's movement across the landscape.

In the embodiments pertaining to cloaking an object in the visible frequency spectrum, a camera captures a static or dynamic view of a scene that is obscured by the object from an observer's view. A projection device or mechanism allows the light of the captured view, to wit, the ambient signals in the visible frequency spectrum, to reach an array of detecting components in the matrix. Without the use of a computer or a data processing system, the light, or the visual frequency spectrum signals, is/are used to activate a corresponding array of emitting components in the matrix.

In one example embodiment, the detecting components comprise light-sensing semiconductor structures, such as a light-activated diode, which converts light frequency and intensity to corresponding electrical signals. In certain embodiments, the detecting components have a one-to-one correspondence with emitting components. In other embodiments, a one-to-n and n-to-m correspondence between the detecting components and the emitting components is also configurable depending upon the components used.

As an example, an emitting component can be a semiconductor component that converts an electrical signal to a corresponding light frequency and intensity. In such example configuration, a set of red, green, and blue (RGB) light-sensing diodes receive the light of the background or ambience that is obstructed by the object from an observer's view. The matrix comprises many sets of RGB light-sensing diodes. Each set of RGB light-sensing diodes in the matrix is coupled with a corresponding set of RGB light-emitting diodes (LEDs) in the matrix. When a particular set of RGB light-sensing diodes detect the incident light, that set of RGB light-sensing diodes sends the appropriate electrical signals to a corresponding set of RGB LEDs. Without using any computer or data processing system, the set of RGB LEDs then converts the electrical signals back into the light that is incident upon the corresponding set of RGB light-sensing diodes at that instant of time.

The detecting components and the emitting components are flexibly oriented relative to one another. In one embodiment, the detecting components and the emitting components are paired such that they form the opposite sides of a screen. In another embodiment, the detecting components are located such that they can receive the incident light from the desired section of the background or ambience, and the emitting components are located such that they can project that desired section of the background or ambience to an observer.

An embodiment is configurable to alleviate an obstruction caused by an object in other-than-visible frequency spectrum or spectra. For example, one embodiment alleviates an obstruction caused by the object in Radio Detection And Ranging (RADAR) frequencies, another embodiment alleviates an obstruction caused by the object in Light Detection And Ranging (LIDAR) frequencies, and another embodiment alleviates an obstruction caused by the object in Sound Navigation And Ranging (SONAR) frequencies. Similarly, another embodiment alleviates an obstruction caused by the object in microwave frequencies, and another embodiment alleviates an obstruction caused by the object in millimeter wavelength frequencies.

Without limiting the illustrative embodiments thereto, some examples of detecting and emitting components usable in other-than-visible frequency ranges are provided herein to enable those of ordinary skill in the art to practice the illustrative embodiments. For example, piezoelectric sensors and transmitters, magneto-restrictive sensors and transmitters, and capacitor-membrane sensors and transmitters can detect and emit signals in sonic frequency ranges. As another example, radio-frequency oscillators and modulators, millimeter wavelength oscillators and modulators, microwave wavelength oscillators and modulators, Terahertz oscillators and modulators, and oscillators and modulators for other electro-magnetic frequency ranges, can detect and emit signals in those corresponding frequency ranges.

A detecting component in the matrix captures an ambient signal, or an otherwise acquired signal, in the given frequency range that is incident upon the object from an observer's point of view. Without the use of a computer or a data processing system, the other-than-visible frequency spectrum signal is used to activate a corresponding array of emitting components in the matrix. The emitting components emit a version of the incident ambient signal such that the object appears to be positioned differently, or not at all, in the view of the observer in that frequency range than the object actually is positioned in the view of the observer.

In one example embodiment, the detecting components comprise radar receiving structures, which convert the incident radar frequency and intensity to a corresponding shifted or offset radar signals. The detecting components have a one-to-one correspondence with emitting components. The emitting components comprise radar frequency emitting structures. In some embodiments, hardware circuitry can be configured to shift or offset the emitted signals. When feasible, other embodiments can be configured to use a computer or a data processing system for computing and causing the shift in the emitted signals.

As an example, an emitting component can be a component that converts an electrical signal to a corresponding radar frequency and intensity. In such example configuration, the matrix comprises many sets of detecting and emitting components with one to one correspondence. When a particular set of detecting components detects the incident radar signal, that set of detecting components sends the appropriate electrical signals to a corresponding set of emitting components. Without using any computer or data processing system, the set of emitting components then converts the electrical signals back into the shifted radar signal. The shifted radar signal makes the object appear in a different position, such as farther or nearer, to the observer than the object actually is at that instant of time. In one embodiment, the shifting or offsetting causes signals in a plurality of wavelengths, intensities, or both, to be emitted, thereby confusing the observer or causing a computation error at an observing system as to a position or velocity of the cloaked object.

The detecting components and the emitting components are flexibly oriented relative to one another. In one embodiment, the detecting components and the emitting components are paired such that they are on the same side of a screen. In another embodiment, the detecting components are located such that they can receive the incident signal from the desired position on the object, and the emitting components are located such that they can project that desired shifted signal to an observer.

The above-described examples of signals in non-visual frequency ranges are not intended to be limiting on the illustrative embodiments. From this disclosure, those of ordinary skill in the art will be able to conceive other types and frequency ranges of ambient signals that can similarly be projected, shifted, or otherwise presented to an observer to cloak an object from the observer, and the same are contemplated within the scope of the illustrative embodiments.

The illustrative embodiments are described with respect to certain signal acquiring devices such as cameras or lenses, projecting devices, matrix or matrices, signal shifting hardware, frequency ranges, signals, types of detecting and emitting components, locations of components, types and relative positions of signals and objects, environments, components, and applications only as examples. Any specific manifestations of such artifacts are not intended to be limiting to the invention. Any suitable manifestation of data processing systems, environments, components, and applications can be selected within the scope of the illustrative embodiments.

The illustrative embodiments are described using specific designs, architectures, layouts, schematics, and tools only as examples and are not limiting to the illustrative embodiments. The illustrative embodiments may be used in conjunction with other comparable or similarly purposed structures, systems, applications, or architectures.

The examples in this disclosure are used only for the clarity of the description and are not limiting to the illustrative embodiments. Other signals, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

FIG. 1 depicts a block diagram of an example environment for deploying a cloaking device in accordance with an illustrative embodiment. Object 102 is an object that is to be cloaked or hidden from a perception of observer 104. In the depiction, object 102 is represented generically as a box-shaped object only, and can be adapted to any suitable shape or form of a given object in question, such as a vehicle or equipment. Similarly, only as an example, observer 104 is depicted as a person, visually perceiving object 102 against ambiance or background 106. Observer 104 can be a system or equipment suitable for perceiving the object 102, ambiance 106, or a combination thereof, in other frequency ranges by perceiving signals in those frequency ranges.

Device 108 is an example device usable for capturing ambient signals, such as a camera to capture light from ambiance 106. The light can be scattered light, laser, or other focused or coherent beam within the scope of the illustrative embodiments. Matrix 110 is an example of an active presentation matrix according to an embodiment. As depicted, matrix 110 is configured to detect and emit light signals.

Object 102, without using matrix 110 would obstruct a portion of observer 104's view of ambience 106, either statically or dynamically. Presentation 112 on matrix 110 imitates the obstructed portion of ambience 106, such that presentation 112 in the obstructed portion and the remainder of unobstructed ambience 106 together imitate an unobstructed view of ambience 106 from observer 104's point of perception.

In an example operation, device 108 collects light from ambience 106 and sends to matrix 110. Some or all detecting components (not shown) of matrix 110 detect the light and convert the light into electrical signals. Corresponding some or all emitting components in matrix 110, on the side shown with presentation 112 in the depiction, receive the electrical signals and convert the electrical signals into light. The light produced by the emitting components forms presentation 112, which observer 104 perceives. As object 102 moves across ambience 106, device 108 captures light from that portion or more of ambience 106 that object 102 is obstructing at a given time from observer 104. Without using a computer or a data processing system, the detecting components and emitting components of matrix 110 collaborate as described earlier to change presentation 112 according to the movement of object 102 to provide observer 104 a seamless view of ambience 106 regardless of object 102's movement.

Figure 2:
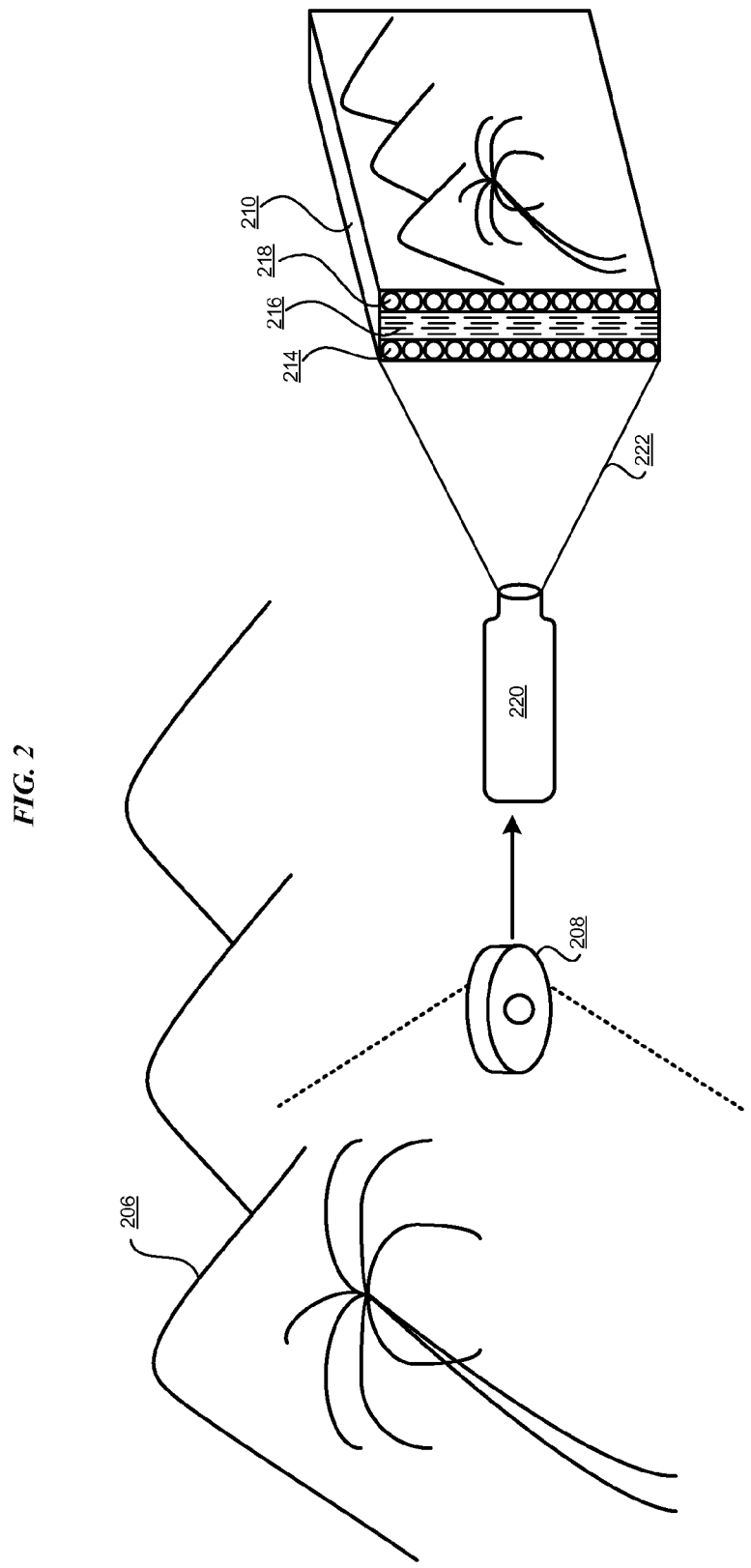
FIG. 2 depicts an example configuration for cloaking in accordance with an illustrative embodiment.

With reference to FIG. 2, this figure depicts an example configuration for cloaking in accordance with an illustrative embodiment. Ambience 206 is an example of ambience 106 in FIG. 1. Device 208 is an example of device 108 in FIG. 1. Matrix 210 is an example of matrix 110 in FIG. 1.

The depiction of FIG. 2 provides an example configuration to communicate the visible frequency light captured by device 208 to matrix 210. In this example configuration, device 208 is electrically or optically coupled with projection device 220, such as by using a conducting cable, an optical fiber, or a radio, microwave or other frequency link. Projection device 220 projects (222) the signal, e.g., light, in a line-of-sight manner onto detecting components 214 of matrix 210. Detecting components 214 are coupled via coupling 216 with emitting components 218.

In one embodiment, coupling 216 comprises electrical coupling using conducting materials. In one embodiment, detecting components 214 and emitting components 216 are collocated on different surfaces of matrix 210. In another embodiment, such as when the ambient signal comprises frequencies other than visible light frequencies, when the ambient signal is incident upon matrix 210 from the location of the observer or other directions, or a combination thereof, detecting components 214 and emitting components 318 can be configured to be separate from one another, and physically located in different locations on the cloaked object. A suitable medium selected for coupling 216 then couples detecting components 214 and emitting components 218 at those distant locations in a line-of-sight, or non-line-of-sight manner, as the case may be.

Figure 3:
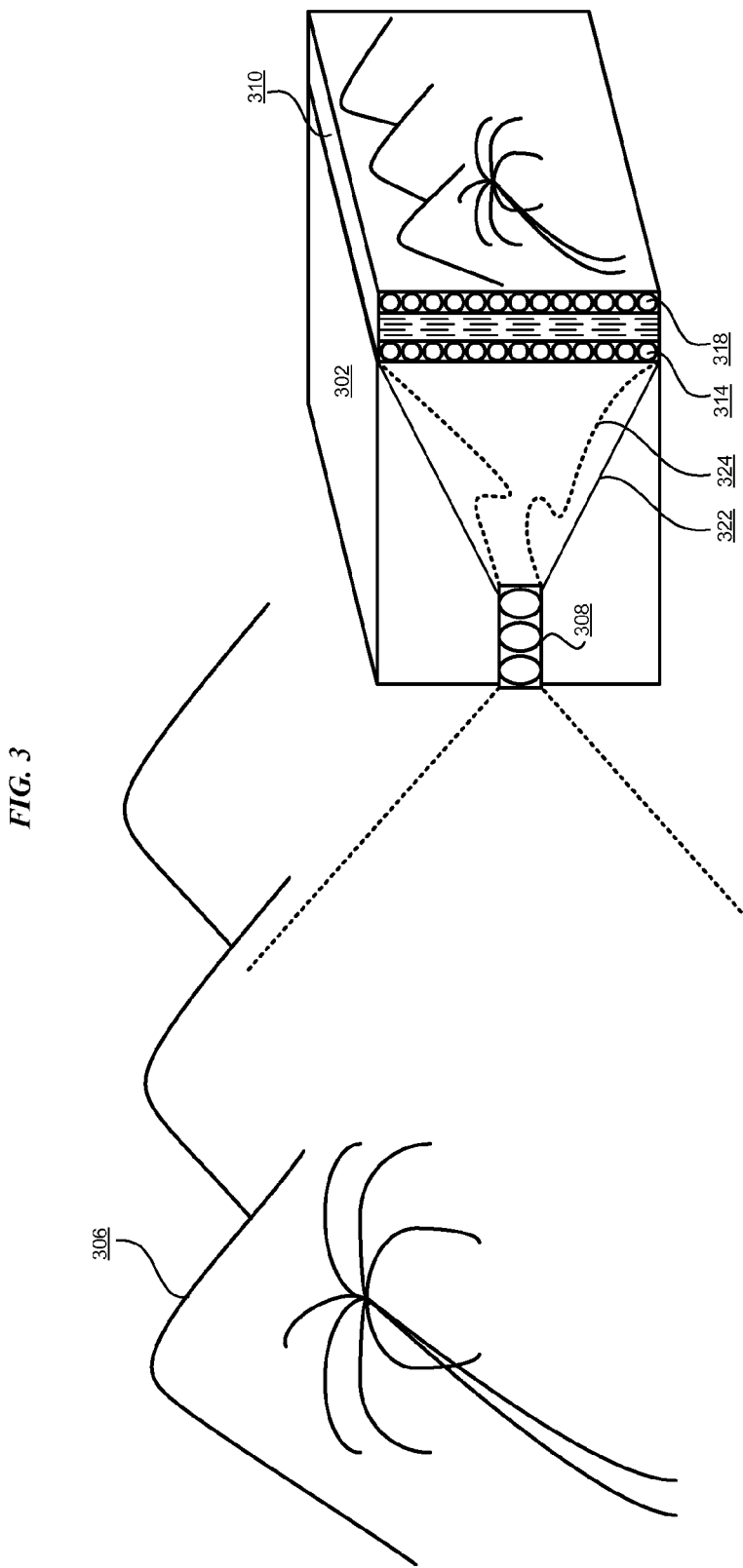
FIG. 3 depicts another example configuration for cloaking in accordance with an illustrative embodiment.

With reference to FIG. 3, this figure depicts another example configuration for cloaking in accordance with an illustrative embodiment. Object 302 is an example of object 102 in FIG. 1. Ambience 306 is an example of ambience 206 in FIG. 2. Device 308 is an example of device 108 in FIG.

1. Matrix 310 is an example of matrix 210 in FIG. 2. Detecting components 314 are an example of detecting components 214 in FIG. 2.

The depiction of FIG. 3 provides another example configuration to communicate the visible frequency light captured by device 308 to matrix 310. In this example configuration, device 308 comprises an aperture or opening, optionally fitted with one or more lenses. Device 308 is coupled with projection device 212 such that the signals, e.g., visible frequency light, collected by device 308 becomes incident upon detecting components 314. In one embodiment, device 308 and matrix 310 are positioned such that the signal can be directly projected in a line-of-sight manner (322) onto detecting components 314.

In another embodiment, device 308 and matrix 310 are positioned anywhere on object 302 regardless of clear line-of-sight between device 308 and matrix 310. Under such circumstances, device 308 sends the collected signals to detecting components 314 via suitable propagation media or device (324), e.g., optical fibre. Matrix 310 presents presentation 312 using emitting components 318 in a manner described elsewhere in this disclosure.

Figure 4:
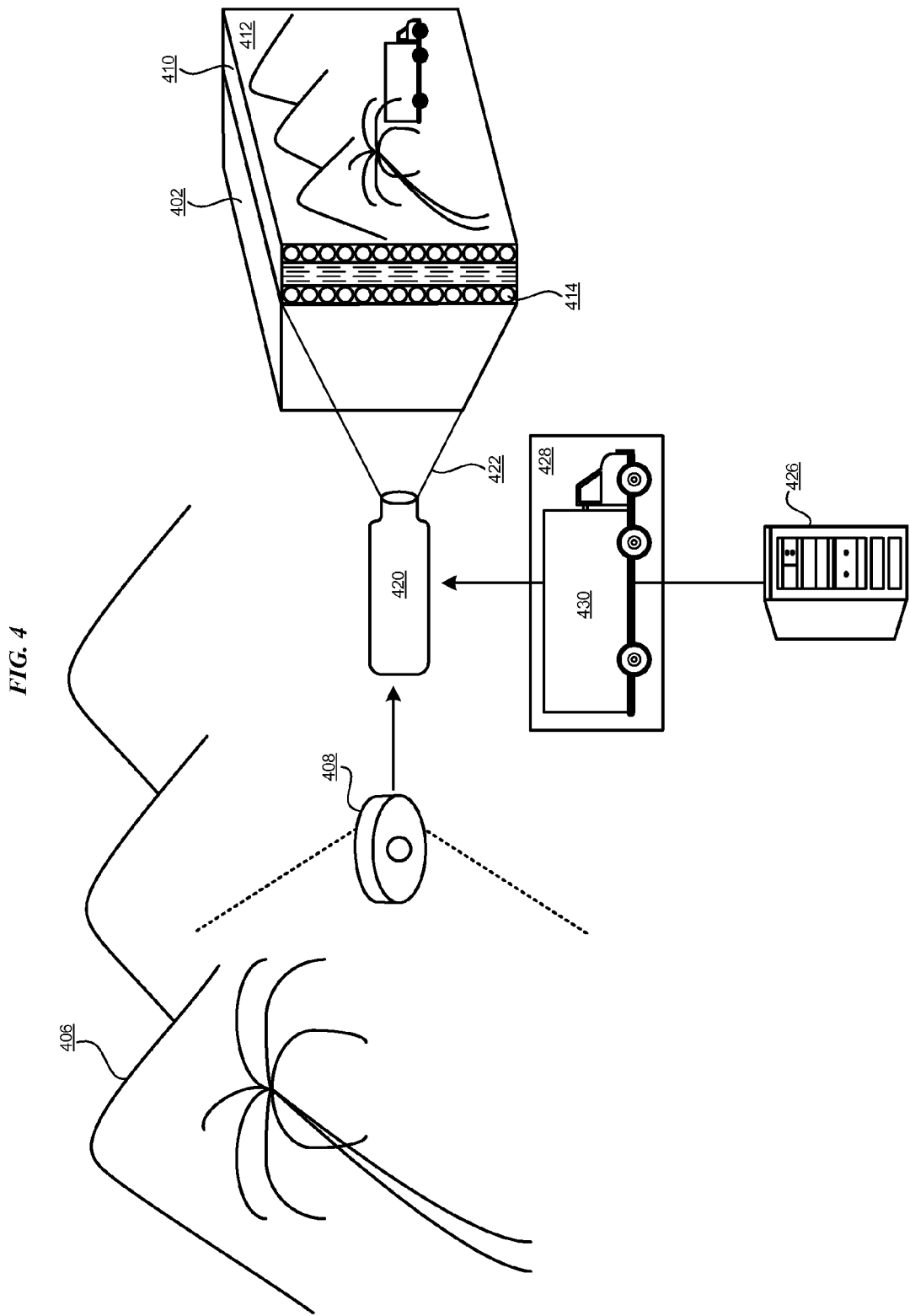
FIG. 4 depicts another example configuration for cloaking in accordance with an illustrative embodiment.

With reference to FIG. 4, this figure depicts another example configuration for cloaking in accordance with an illustrative embodiment. Object 402 is an example of object 302 in FIG. 3. Ambience 406 is an example of ambience 306 in FIG. 3. Device 408 is an example of device 208 in FIG. 2 or device 308 in FIG. 3. Matrix 410 is an example of matrix 310 in FIG. 3.

The depiction of FIG. 4 provides an example configuration to cloak, present a false representation of the cloaked object, or a combination thereof. In this example configuration, device 408 is electrically or optically coupled with projection device 420, as in FIG. 2. Projection device 420 projects (422) the signal onto detecting components 414 of matrix 410.

From computer 426 or another source, projection device 420 receives false image 428. False image 428 comprises an image representation of another object 430, e.g., a vehicle different from the actual vehicle that is object 402, to falsely represent object 402 as other object 430 in false image 428. Projection device 420 combines all or part of false image 428, e.g., only object 430 in one embodiment, with the signal received from device 408. Projection 422 thereby comprises presentation 412 such that from an observer's perspective, other object 430, instead of object 402, appears positioned against ambience 406. In one embodiment, projection device 420, computer 426, or a combination of the two, suitably size, illuminate, and orient object 430 in image 428 such that upon combining with the signal from device 408, presentation 412 presents object 430 within ambience 406 with a proportionality that appears realistic from the observer's point of perception.

Figure 5:
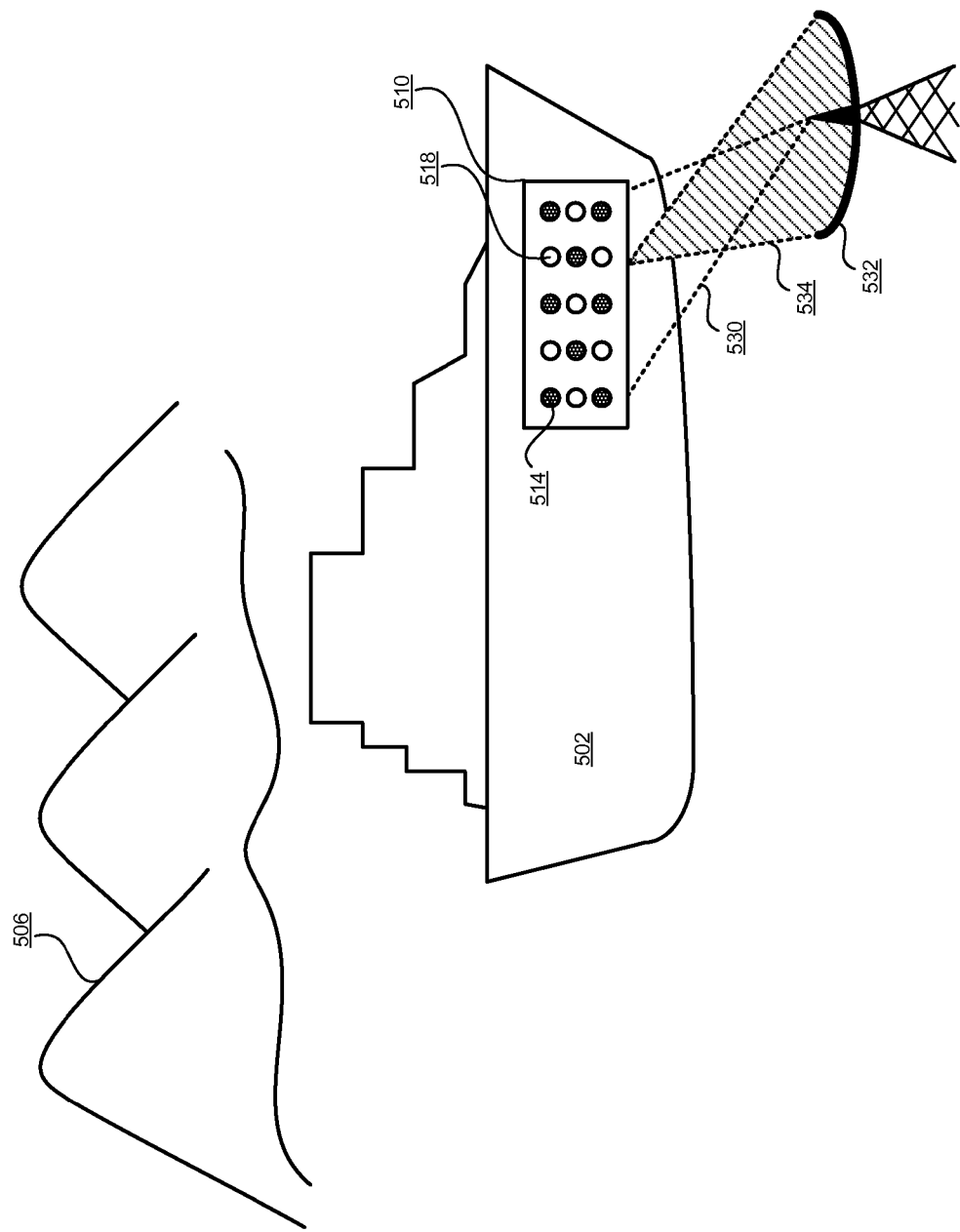
FIG. 5 depicts an example configuration for cloaking in non-visible frequency signals in accordance with an illustrative embodiment.

With reference to FIG. 5, this figure depicts an example configuration for cloaking in non-visible frequency signals in accordance with an illustrative embodiment. Object 502 is an example of object 202 in FIG. 2. Ambience 506 is an example of ambience 206 in FIG. 2. Matrix 510 is an example of matrix 210 in FIG. 2. Detecting components 514 are an example of detecting components 214 in FIG. 2. Emitting components 518 are an example of emitting components 218 in FIG. 2.

The depiction of FIG. 5 provides an example configuration to cloak or obfuscate object 502 in other-than-visible frequency signals, e.g., radar signal 530 emitted by radar transceiver 532. In one example embodiment, as depicted in FIG. 5, detecting components 514 and emitting components 518 are oriented in a similar direction, such as when the source of signal 530 is also the observer of a reflected signal from object 502. If the source of signal and the observer are separately situated, detecting components 514 and emitting components 518 can be oriented differently so that detecting components 514 are optimally oriented to receive the signal, and emitting components 518 are optimally oriented to present the shifted, scrambled, or obfuscated signal 534 to the observer.

In the depicted embodiment, detecting components 514 detect radar signal 530, transform the received radar signal 530, and send to emitting components 518. Detecting components 514 communicate the transformed signal (not shown) via a suitable coupling (not shown) with emitting components 518 as described elsewhere in the disclosure, e.g., as an electrical or optical signal.

Detecting components 514 configure the transformed signal such that emitting components 518 present signal 534 to the observer, e.g., radar transceiver 532 in the depicted scenario. In one embodiment, transformed signal is configured such that signal 534 is absent, i.e., radar transceiver 532 receives no reflection of signal 530. In another embodiment, transformed signal is configured such that signal 534 is scrambled, i.e., radar transceiver 532 is prevented from understanding, decoding, deciphering, or otherwise manipulating signal 534 to conclude that signal 534 is a reflection of or response to signal 530.

In another embodiment, transformed signal is configured such that signal 534 is shifted in frequency, phase, amplitude, or another characteristic relative to signal 530 such that radar transceiver 532 is misled into believing that signal 534 is not a reflection of signal 530, thereby ignoring object 502's presence in a view of ambience 506. In another embodiment, transformed signal is configured such that signal 534 is shifted in time, power, or another characteristic relative to signal 530 such that radar transceiver 532 is misled into believing that object 502 is situated at a different location or at a different velocity, e.g., farther or nearer, faster or slower, approaching or receding, climbing or descending, that an actual location or velocity of object 502 relative to the observer, e.g., radar transceiver 532.

Figure 6:
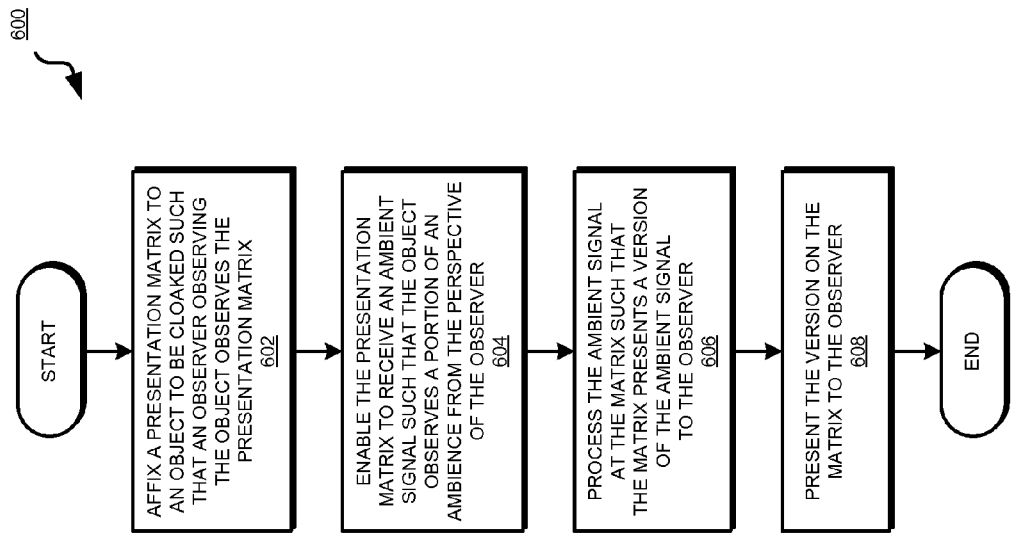
FIG. 6 depicts a flowchart of an example process of cloaking using a cloaking device in accordance with an illustrative embodiment.

With reference to FIG. 6, this figure depicts a flowchart of an example process of cloaking using a cloaking device in accordance with an illustrative embodiment. Process 600 can be implemented using matrix 210, 310, 410, or 510 in FIG. 2, 3, 4, or 5, respectively.

Process 600 affixes the matrix to an object that is to be cloaked such that an observer observing the object observes a presentation on the matrix (block 602). Process 600 enables, without using a computer or a data processing system, the matrix to receive an ambient signal such that the object obscures at least a portion of an ambience from the observer (block 604).

Process 600 processes, without using a computer or a data processing system, the ambient signal at the matrix or a component thereof, such that the matrix presents a version of the ambient signal to the observer (block 606). Process 600 presents, without using a computer or a data processing system, the version on the matrix to the observer (block 608). Process 600 ends thereafter or continues to perform the operations of blocks 604-608 when the ambience, the obstructed portion of the ambience, a position of the object, a shape of the object, a position of the observer, or a combination thereof, changes.

Figure 7:
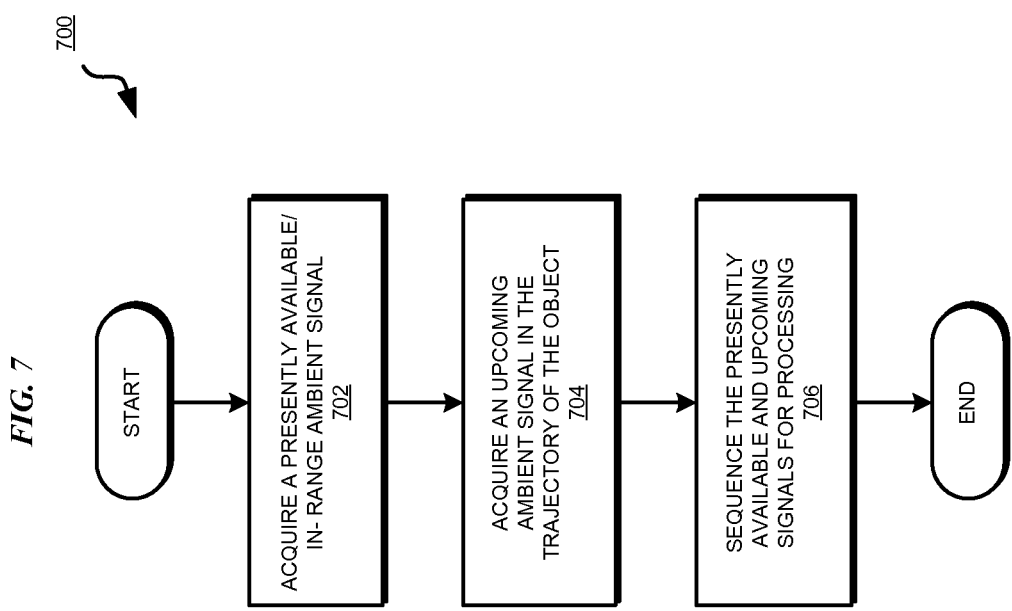
FIG. 7 depicts a flowchart of another process for dynamic cloaking using a cloaking device in accordance with an illustrative embodiment.

With reference to FIG. 7, this figure depicts a flowchart of another process for dynamic cloaking using a cloaking device in accordance with an illustrative embodiment. Process 700 can be implemented in block 606 of process 600 in FIG. 6.

Process 700 acquires a presently available, or in-range ambient signal (block 702). Process 700 further acquires an upcoming ambient signal in the trajectory of the object's movement (block 704). For example, if the object is a vehicle traveling across an ambience, the upcoming ambient signal can be a future portion of the ambience that would be obstructed by the object at a future time during the movement.

Process 700 sequences the presently available and upcoming signals for processing, e.g., in block 606 of process 600 in FIG. 6 (block 706). Process 700 ends thereafter or continues to perform the operations of blocks 702-706 when the ambience, the obstructed portion of the ambience, a position of the object, a shape of the object, a position of the observer, or a combination thereof, changes.

Figure 8:
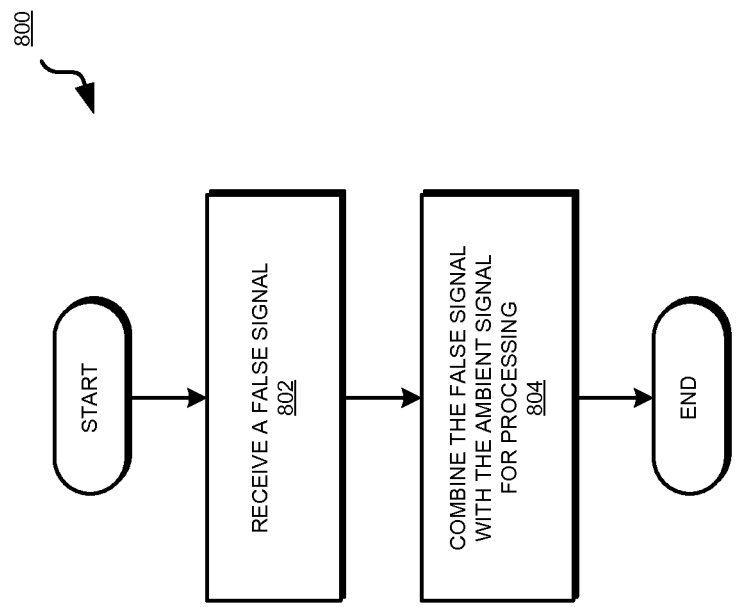
FIG. 8 depicts a flowchart of another process for cloaking by false presentation using a cloaking device in accordance with an illustrative embodiment.

With reference to FIG. 8, this figure depicts a flowchart of another process for cloaking by false presentation using a cloaking device in accordance with an illustrative embodiment. Process 800 can be implemented in block 606 of process 600 in FIG. 6.

Process 800 receives a false signal, such as from another signal source, computer, or data processing system, or a combination thereof, (block 802). In one embodiment, the false signal comprises a false image, as in FIG. 4. In another embodiment, the false signal comprises a signal, value, or computation, to enable a shifting or manipulation of an emitted signal, as in FIG. 5.

Process 800 combines the false signal with the ambient signal for processing, such as in block 606 of process 600 in FIG. 6 (block 804). Process 800 ends thereafter or continues to perform the operations of blocks 802-804 when the ambience, the ambient signal, the false signal, the obstructed portion of the ambience, a position of the object, a shape of the object, a position of the observer, or a combination thereof, changes.

Figure 9:
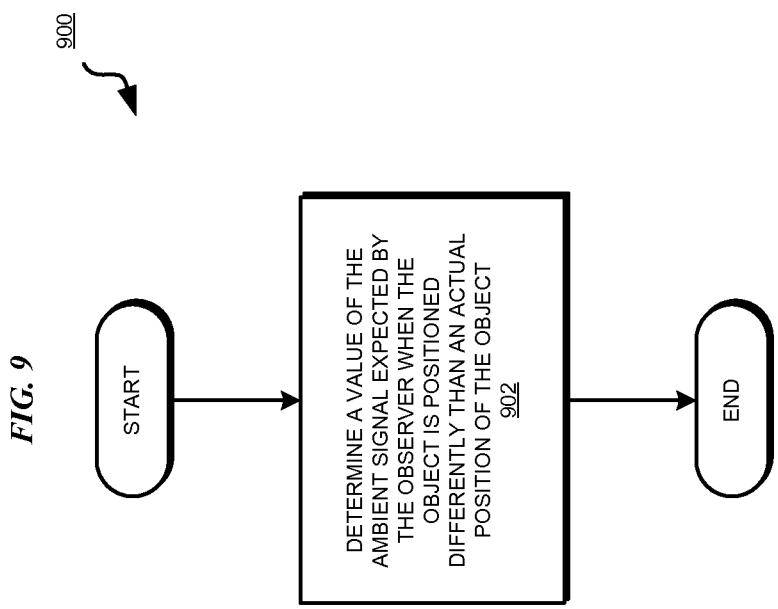
FIG. 9 depicts a flowchart of another process for cloaking by false presentation using a cloaking device in accordance with an illustrative embodiment.

With reference to FIG. 9, this figure depicts a flowchart of another process for cloaking by false presentation using a cloaking device in accordance with an illustrative embodiment. Process 900 can be implemented in block 804 of process 800 in FIG. 8.

Process 900 determines a value of the ambient signal expected by the observer when the object is positioned differently from an actual position of the object, or has a velocity, i.e., speed and/or direction, different from an actual velocity of the object (block 902). Process 800 then uses the value in performing the operation of block 804.

Process 900 ends thereafter or continues to perform the operations of block 902 when the ambience, the ambient signal, the false signal, the obstructed portion of the ambience, a position of the object, a shape of the object, a position of the observer, or a combination thereof, changes.

Thus, a method is provided in the illustrative embodiments for cloaking an object from an observer using a cloaking device. Certain embodiments are described with respect to certain frequency ranges separately only as examples for the clarity of the description. Different embodiments can be combined or otherwise used together within the scope of the illustrative embodiments. For example, an embodiment to cloak an object in visible light can be combined with another embodiment to cloak the object in radar frequencies, and two or more other embodiments can be similarly combined within the scope of the illustrative embodiments.

The present invention may be a system, a method, and/or an apparatus. Aspects of the present invention are described herein with reference to flowchart illustrations and/or block diagrams of methods, apparatus, and systems according to embodiments of the invention.

The flowchart and block diagrams in the Figures illustrate the architecture, functionality, and operation of possible implementations of systems, methods, and apparatus according to various embodiments of the present invention. In this regard, each block in the flowchart or block diagrams may represent a module, segment, or portion of operations. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware.

What is claimed is:

1. A method for cloaking an object from an observer, the method comprising:

affixing a hardware device to the object such that the observer observes a presentation on the device when observing the object;

enabling the device to receive a signal, wherein the signal corresponds to a portion of an ambience obscured by the object from a view of the observer and wherein the signal includes a first intensity, a first wavelength, a first frequency, a first phase and a first amplitude, the object being positioned at an actual position relative to the portion of the ambience from a point of perception of the observer, wherein the device includes a set of detecting components, wherein the set of detecting components includes a plurality of distinct detecting components arranged in a first array, and wherein each distinct detecting component in the set of detecting components receives the signal;

performing a direct conversion of the signal without passing the signal through a data processing system, thereby creating a form of the signal, wherein the form of the signal includes a plurality of wavelengths and a plurality of intensities and wherein the form of the signal differs from the first frequency, the first phase, and the first amplitude;

constructing, using the device, the presentation using the form of the signal, wherein the presentation cloaks the object from the ambience in the view of the observer by causing the object to appear at a second position relative to the portion of the ambience, the second position being different from the actual position of the object from the point of perception of the observer, wherein the device includes a set of emitting components to construct the presentation using the form of the signal, wherein the set of emitting components includes a plurality of distinct emitting components arranged in a second array, wherein the set of detecting components includes an n-to-m correspondence with the set of emitting components, wherein the set of detecting components and the set of emitting components form opposite sides of a screen, and wherein an electrical coupling formed of conducting materials is disposed between the set of detecting components and the set of emitting components;

acquiring the signal, wherein the signal is available at the object at a first time;

acquiring a second signal, wherein the second signal is available at the object at a second time; and sequencing the signal and the second signal such that the processing and presenting continues to update the presentation according to a movement of the object from the first time to the second time, during the movement.

2. The method of claim 1, further comprising:

orienting a detecting component in the set of detecting components to a source of the signal; and orienting an emitting component in the set of emitting components to the observer.

3. The method of claim 2, wherein the source of the signal is the portion.

4. The method of claim 2, wherein each distinct detecting component in the set of detecting components corresponds to a distinct emitting component in the set of emitting components.

5. The method of claim 1, further comprising:

configuring the device with an input device; and communicating, from the input device to a detecting component in the device, the signal, wherein the communicating occurs without a use of a data processing system.

6. The method of claim 1, further comprising:

combining, to form the form of the signal, a false representation of the object to the signal, wherein the false representation of the object causes the observer to perceive a presence of a second object in the view of the observer instead of a presence of the object in the view of the observer.

7. The method of claim 1, wherein the signal comprises projected light from a projection device onto the set of detecting components to project a feature in the ambience onto the set of detecting components.

8. The method of claim 1, wherein the signal is of a frequency other than a frequency range of light visible to humans. humans.

* * * * *